United States Patent
Onai et al.

(10) Patent No.: US 8,611,648 B2
(45) Date of Patent: Dec. 17, 2013

(54) FOREGROUND REGION EXTRACTION PROGRAM, FOREGROUND REGION EXTRACTION APPARATUS AND FOREGROUND REGION EXTRACTION METHOD

(75) Inventors: Rikio Onai, Choufu (JP); Takahiro Hayashi, Choufu (JP); Tatsuya Kiyono, Choufu (JP); Masaya Mori, Shinagawa-ku (JP); Masahiro Sanjo, Shinagawa-ku (JP)

(73) Assignees: Rakuten, Inc., Tokyo (JP); The University of Electro-Communications, Tokyo (JP)

( * ) Notice: Subject to any disclaimer, the term of this patent is extended or adjusted under 35 U.S.C. 154(b) by 184 days.

(21) Appl. No.: 13/063,334

(22) PCT Filed: Sep. 17, 2009

(86) PCT No.: PCT/JP2009/066245
§ 371 (c)(1),
(2), (4) Date: Mar. 10, 2011

(87) PCT Pub. No.: WO2010/035682
PCT Pub. Date: Apr. 1, 2010

(65) Prior Publication Data
US 2011/0164814 A1 Jul. 7, 2011

(30) Foreign Application Priority Data
Sep. 25, 2008 (JP) ................. 2008-245350

(51) Int. Cl.
G06K 9/00 (2006.01)
(52) U.S. Cl.
USPC .......................... 382/164; 382/165
(58) Field of Classification Search
USPC .................. 382/162, 164, 165, 224, 225
See application file for complete search history.

(56) References Cited

U.S. PATENT DOCUMENTS

| | | | |
|---|---|---|---|
| 6,134,345 A * | 10/2000 | Berman et al. | 382/162 |
| 7,508,455 B2 * | 3/2009 | Liu et al. | 348/587 |
| 8,094,943 B2 * | 1/2012 | Eaton et al. | 382/190 |

FOREIGN PATENT DOCUMENTS

| | | |
|---|---|---|
| JP | 5-028263 A | 2/1993 |
| JP | 10-340334 A | 12/1998 |

OTHER PUBLICATIONS

Yin Li et al., "Lazy Snapping", AMC Transactions on Graphics (TOG), Aug. 2004, pp. 303-308, vol. 23, Issue 3.

(Continued)

*Primary Examiner* — Phuoc Tran
(74) *Attorney, Agent, or Firm* — Sughrue Mion, PLLC

(57) ABSTRACT

There are provided a foreground region extraction program, a foreground region extraction apparatus, and a foreground region extraction method capable of clipping an object region (foreground region) at high speed.
An arrangement is as follows: Foreground pixels designated by a user and background pixels designated thereby are each set as a reference pixel to identify, from among a plurality of divided color spaces created by a three-dimensional color space being divided, the divided color space to which each of the reference pixels belongs, as a reference divided color space. Color distance calculation processing to calculate a color distance in the color space between each reference pixel and an adjacent pixel adjacent thereto is performed, and belonging judgment processing to judge whether each of the adjacent pixels belongs to each of the reference divided color spaces is performed, and then, cost calculation processing to calculate a cost of each adjacent pixel is performed, based on the color distance calculated for each of the adjacent pixels, and weights based on whether to belong to the reference divided color space judged for each of the adjacent pixels. Further determination processing to determine the adjacent pixel having the lowest calculated cost as a foreground pixel or background pixel is performed, and a foreground region is extracted from the image by using the determined adjacent pixel as a reference pixel to repeatedly perform the color distance calculation processing, the belonging judgment processing, the cost calculation processing, and the determination processing.

12 Claims, 9 Drawing Sheets

(56) References Cited

OTHER PUBLICATIONS

Extended European Search Report dated Nov. 2, 2012 for EP 09816097.

Olivier Juan et al., "Trimap Segmentation for Fast and User-Friendly Alpha Matting", Variational, Geometric, and Level Set Methods in Computer Vision: Third International Workshop, VLSM 2005, Beijing, China, Oct. 16, 2005, Proceedings [Lecture Notes in Computer Science, 3752], pp. 186-197, Berlin, Germany.

Joris E Van Zwieten et al., "Digitisation and 3D Reconstruction of 30 Year Old Microscopic Sections of Human Embryo, Foetus and Orbit", Image Analysis and Recognition Lecture Notes in Computer Science, Jan. 1, 2006, pp. 636-647, Berlin, Germany.

Chinese Office Action issued in Chinese Patent Application No. 200980137340.6 dated Apr. 22, 2013.

Zheng Wei Gao, "A Study of the image foreground extraction technology," full-text database information science and technology series of China Excellent Master Thesis, Jul. 15, 2008, Section 7, pp. 15-29.

\* cited by examiner

FOREGROUND REGION EXTRACTION PROGRAM, FOREGROUND REGION EXTRACTION APPARATUS AND FOREGROUND REGION EXTRACTION METHOD

CROSS REFERENCE TO RELATED APPLICATIONS

This application is a National Stage of International Application No. PCT/JP2009/066245 filed on Sep. 17, 2009, which claims priority from Japanese Patent Application No. 2008-245350, filed on Sep. 25, 2008, the contents of all of which are incorporated herein by reference in their entirety.

TECHNICAL FIELD

The present invention relates to a field of technology that clips an object region from an image.

BACKGROUND ART

Extraction of an object region (foreground region) from an image is used in many cases such as processing of photos or moving images. As an extraction technology of such an object region, for example, technology such as logic of Lazy Snapping (see Non-Patent Document 1) that extracts an object region based on a cue line in an object region drawn by the user and a cue line in a background region drawn by the user is known. Lazy Snapping is characterized in that extraction of an object region is realized only by drawing several cue lines in regions and the object region is successively re-extracted each time a line is added so that the user can add or delete a line while viewing an extraction result.

PRIOR ART DOCUMENT

Non-Patent Document

[Non-Patent Document 1] Y. Li, J. Sun, C. K. Tang and H. Y. Shum, "Lazy Snapping," ACM Transactions on Graphics (TOG), Vol. 23, Issue. 3, pp. 303-308, Aug. 2004.

SUMMARY OF THE INVENTION

Problem to be Solved by the Invention

However, according to the above conventional extraction technology of an object region, while an object region desired by the user can be clipped by, for example, adding a cue line in the end, it may take time before the object region is correctly clipped.

The present invention has been made in view of the above problem or the like and an object thereof is to provide a foreground region extraction program, a foreground region extraction apparatus, and a foreground region extraction method capable of clipping an object region (foreground region) at high speed.

Means for Solving the Problem

In order to solve the above problem, the invention according to claim 1 relates to a foreground region extraction program causing a computer to function as:

a display control means for causing an image to be displayed;

an acceptance means for accepting designation of at least one foreground pixel in a foreground region contained in the displayed image and at least one background pixel in a background region contained in the image, from a user;

a divided color space identification means for performing divided color space identification processing to identify, from among a plurality of divided color spaces created by a three-dimensional color space being divided, the divided color space to which, after the designated foreground pixel and the designated background pixel each being set as a reference pixel, each of the reference pixels belongs, as a reference divided color space;

a color distance calculation means for performing color distance calculation processing to calculate a color distance in the color space between each of the reference pixels and an adjacent pixel adjacent thereto;

a belonging judgment means for performing belonging judgment processing to judge whether each of the adjacent pixels belongs to each of the reference divided color spaces;

a cost calculation means for performing cost calculation processing to calculate a cost of each of the adjacent pixels, based on the color distance calculated for each of the adjacent pixels, and weights based on whether to belong to the reference divided color space judged for each of the adjacent pixels; and a determination means for performing determination processing to determine the adjacent pixel having the lowest calculated cost as a foreground pixel or a background pixel, wherein the determined adjacent pixel is set as a reference pixel to cause the computer to repeatedly perform the color distance calculation processing, the belonging judgment processing, the cost calculation processing, and the determination processing so that the computer functions to extract the foreground region from the image.

According to the invention, an object region (foreground region) desired by the user can be clipped at high speed.

The invention according to claim 2 relates to the foreground region extraction program according to Claim 1, wherein if the adjacent pixel adjacent to the reference pixel belongs to the reference divided color space, the weight is made smaller.

The invention according to claim 3 relates to the foreground region extraction program according to Claim 1 or 2, wherein the foreground pixels designated by the user are foreground pixels corresponding to each of at least two mutually different colors constituting a texture pattern appearing in the foreground region.

According to the invention, the foreground and the background can correctly be divided even if there is a texture pattern in an image.

The invention according to claim 4 relates to the foreground region extraction program according to any one of Claims 1 to 3, wherein if the adjacent pixel adjacent to the reference pixel does not belong to the reference divided color space, the cost is accumulated and, if the accumulated cost exceeds a threshold, a foreground and a background are inverted.

According to the invention, the foreground and the background can correctly be caused to be inverted in an enclave even if there is anti-aliasing in an outline portion of the enclave.

The invention according to claim 5 relates to a foreground region extraction apparatus, comprising:

a display control means for causing an image to be displayed;

an acceptance means for accepting designation of at least one foreground pixel in a foreground region contained in the displayed image and at least one background pixel in a background region contained in the image, from a user;

a divided color space identification means for performing divided color space identification processing to identify, from among a plurality of divided color spaces created by a three-dimensional color space being divided, the divided color space to which, after the designated foreground pixel and the designated background pixel each being set as a reference pixel, each of the reference pixels belongs, as a reference divided color space;

a color distance calculation means for performing color distance calculation processing to calculate a color distance in the color space between each of the reference pixels and an adjacent pixel adjacent thereto;

a belonging judgment means for performing belonging judgment processing to judge whether each of the adjacent pixels belongs to each of the reference divided color spaces;

a cost calculation means for performing cost calculation processing to calculate a cost of each of the adjacent pixels, based on the color distance calculated for each of the adjacent pixels, and weights based on whether to belong to the reference divided color space judged for each of the adjacent pixels; and a determination means for performing determination processing to determine the adjacent pixel having the lowest calculated cost as a foreground pixel or a background pixel, wherein the determined adjacent pixel is set as a reference pixel to repeatedly perform the color distance calculation processing, the belonging judgment processing, the cost calculation processing, and the determination processing to extract the foreground region from the image.

The invention according to claim 6 relates to a foreground region extraction method executed by a computer, comprising:

a display control process of causing an image to be displayed;

an acceptance process of accepting designation of at least one foreground pixel in a foreground region contained in the displayed image and at least one background pixel in a background region contained in the image, from a user;

a divided color space identification process of performing divided color space identification processing to identify, from among a plurality of divided color spaces created by a three-dimensional color space being divided, the divided color space to which, after the designated foreground pixel and the designated background pixel each being set as a reference pixel, each of the reference pixels belongs, as a reference divided color space;

a color distance calculation process of performing color distance calculation processing to calculate a color distance in the color space between each of the reference pixels and an adjacent pixel adjacent thereto;

a belonging judgment process of performing belonging judgment processing to judge whether each of the adjacent pixels belongs to each of the reference divided color spaces;

a cost calculation process of performing cost calculation processing to calculate a cost of each of the adjacent pixels, based on the color distance calculated for each of the adjacent pixels, and weights based on whether to belong to the reference divided color space judged for each of the adjacent pixels; and a determination process of performing determination processing to determine the adjacent pixel having the lowest calculated cost as a foreground pixel or a background pixel, wherein the determined adjacent pixel is set as a reference pixel to repeatedly perform the color distance calculation processing, the belonging judgment processing, the cost calculation processing, and the determination processing to extract the foreground region from the image.

Effect of the Invention

According to the present invention, foreground pixels designated by a user and background pixels designated thereby are each set as a reference pixel to identify, from among a plurality of divided color spaces created by a three-dimensional color space being divided, the divided color space to which each of the reference pixels belongs as a reference divided color space, color distance calculation processing to calculate a color distance in the color space between each reference pixel and an adjacent pixel adjacent thereto and belonging judgment processing to judge whether each of the adjacent pixels belongs to each of the reference divided color spaces are performed and then, cost calculation processing to calculate a cost of each adjacent pixel is performed based on the color distance calculated for each of the adjacent pixels and weights based on whether to belong to the reference divided color space judged for each of the adjacent pixels, further determination processing to determine the adjacent pixel having the lowest calculated cost as a foreground pixel or background pixel is performed, and a foreground region is extracted from the image by using the determined adjacent pixel as a reference pixel to repeatedly perform the color distance calculation processing, the belonging judgment processing, the cost calculation processing, and the determination processing and therefore, an object region (foreground region) desired by the user can be clipped at high speed.

MODE FOR CARRYING OUT THE INVENTION

A preferred embodiment of the present invention will be described in detail below with reference to drawings. The embodiment described below is an embodiment when the present invention is applied to an image edit apparatus that clips an object region from an image by dividing the image into the foreground and the background using cue lines (handwritten lines) drawn by the user as tips. Here, the "foreground" means an image displaying a search target such as a person and article and the "background" means an image excluding a search target.

Figure 1:
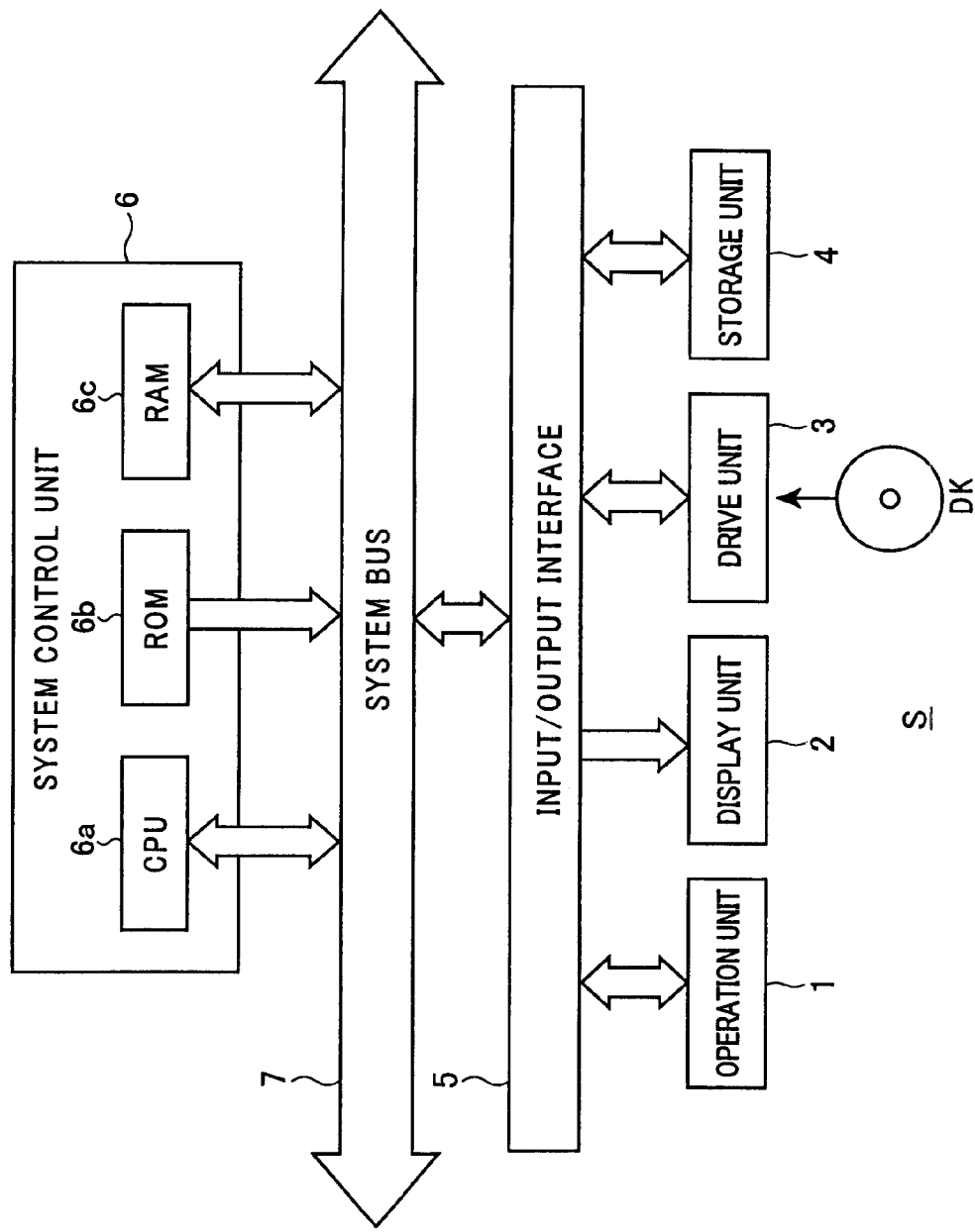
FIG. 1 is a diagram showing an outline configuration example of an image edit apparatus S according to the present embodiment.

FIG. 1 is a diagram showing an outline configuration example of the image edit apparatus S according to the present embodiment.

As shown in FIG. 1, the image edit apparatus S includes an operation unit 1, a display unit 2, a drive unit 3, a storage unit 4, an input/output interface unit 5, and a system control unit 6, and the system control unit 6 and the input/output interface unit 5 are connected via a system bus 7. Incidentally, a personal computer can be applied as the image edit apparatus S.

The operation unit 1 is comprised of, for example, a keyboard and a mouse, and accepts an operation instruction from the user and outputs content of the instruction to the system control unit 6 as an instruction signal.

The display unit 2 is comprised of, for example, a CRT (Cathode Ray Tube) display, liquid crystal display or the like and displays information such as characters and images.

The drive unit 3 reads data or the like from a disc DK (recording medium) such as a flexible disc, CD (Compact Disc), and DVD (Digital Versatile Disc) and at the same time, records data or the like on the disc DK (recording medium).

The input/output interface unit 5 performs interface processing between the operation unit 1 or the storage unit 4 and the system control unit 6.

The storage unit 4 is comprised of, for example, a hard disc drive and stores the operating system (O/S), various programs and data. Here, programs stored in the storage unit 4 include a dynamic image edit application program (having a foreground region extraction program of the present invention).

The dynamic image edit application program is provided by being recorded on a disc DK such as a CD-ROM or being downloaded from a server connected to a network NW before being installed for use.

The system control unit 6 includes a CPU (Central Processing Unit) 6a, a ROM (Read Only Memory) 6b, and a RAM (Random Access Memory) 6c used as a main memory and an image memory. The system control unit 6 functions as a display control means, acceptance means, divided color space identification means, color distance calculation means, belonging judgment means, cost calculation means, and determination means by executing the dynamic image edit application program to perform foreground region extraction processing.

Here, the foreground region extraction processing will be described with reference to FIG. 2.

Figure 2:
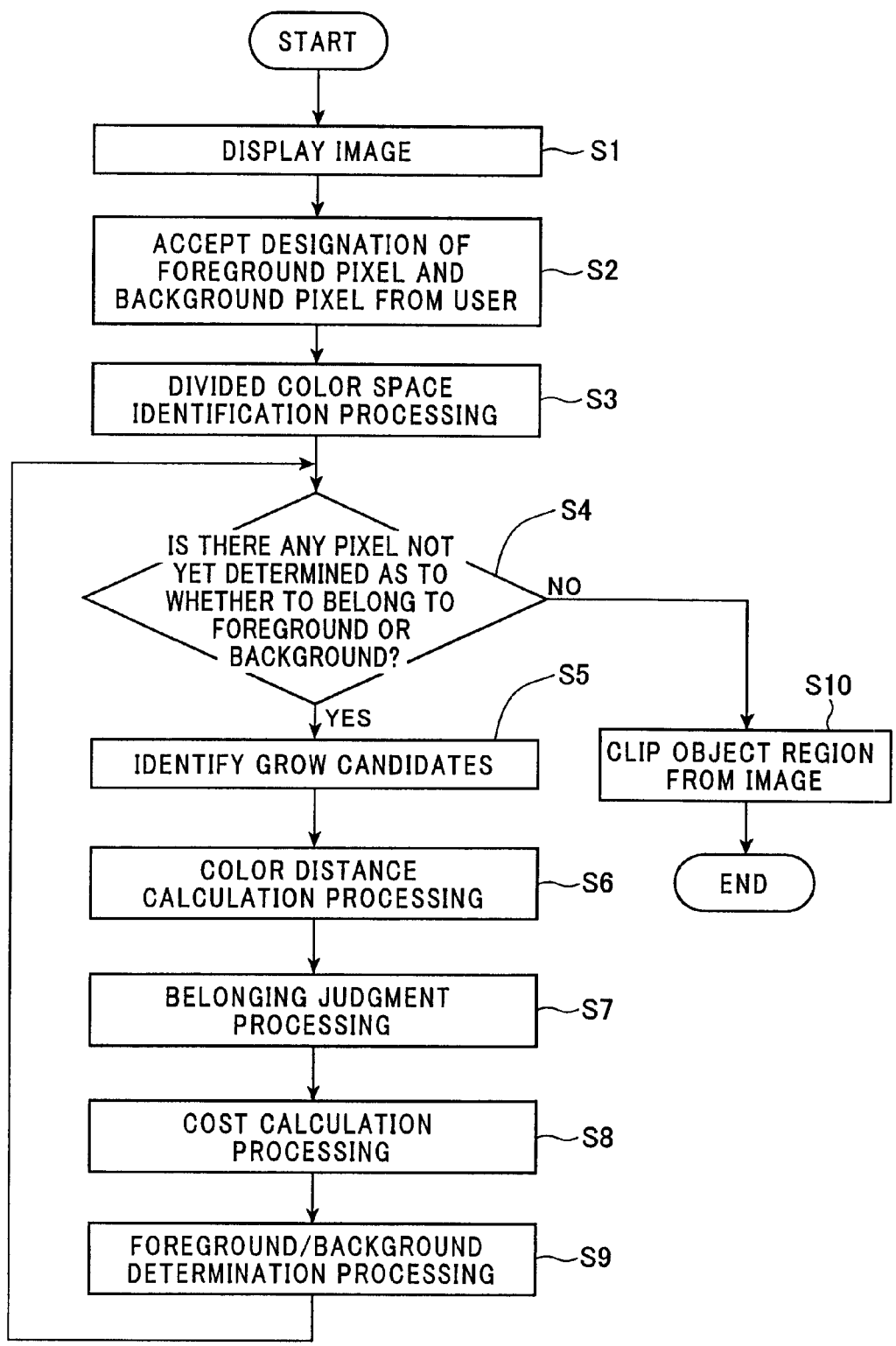
FIG. 2 is a flow chart showing an example of foreground region extraction processing by a system control unit 6.

FIG. 2 is a flow chart showing an example of foreground region extraction processing by the system control unit 6.

The processing shown in FIG. 2 is started by, for example, activation of the dynamic image edit application program. When the processing is started, the system control unit 6 causes the display unit 2 to display a still image in a moving image instructed through the operation unit 1 (step S1).

Next, the system control unit 6 accepts designation of at least one foreground pixel in a foreground region contained in the displayed image and at least one background pixel in a background region contained in the image (step S2) and registers (stores in a registration region of the RAM) the pixels as the determined foreground pixels and the determined background pixels. For example, foreground pixels can be designated by a cue line being drawn in the desired foreground region (object region) with the mouse operated by the user and background pixels can be designated by a cue line being drawn in the desired background region with the mouse operated by the user.

Figure 3:
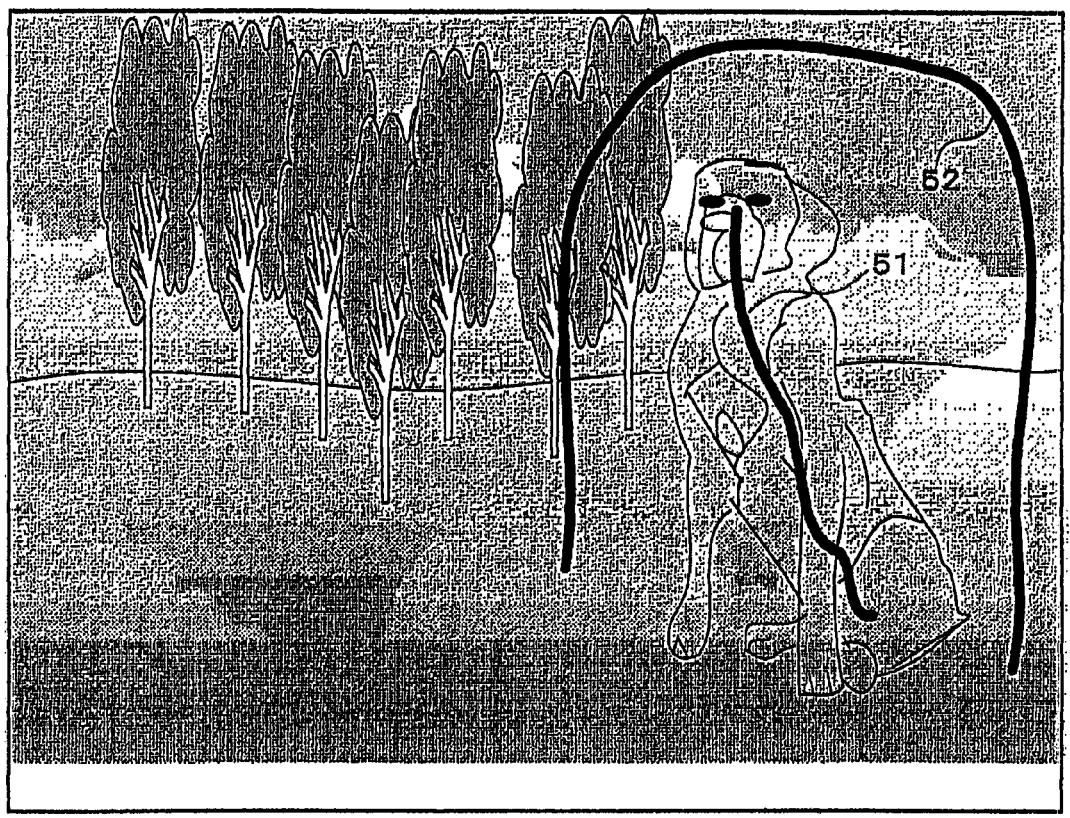
FIG. 3 is a diagram showing an example of cue lines drawn in a foreground region and a background region.

FIG. 3 is a diagram showing an example of cue lines drawn in a foreground region and a background region of a photo image. In the example in FIG. 3, a plurality of pixels overlapping with a cue line 51 are designated as foreground pixels and a plurality of pixels overlapping with a cue line 52 are designated as background pixels. Incidentally, in the example in FIG. 3, an object region of a dog is the foreground region desired by the user. If a tree is the foreground region desired by the user in FIG. 3, the object region of the tree becomes the foreground region other regions including the dog become the background region.

Next, the system control unit 6 performs divided color space identification processing (step S3). In the divided color space identification processing, at least one foreground pixel designated above and at least one designated background pixel are each set as a reference pixel and a reference bucket belonging to each reference pixel is identified from a plurality of divided color spaces (hereinafter, referred to as "buckets") created by a three-dimensional RGB color space being divided.

Figure 4:
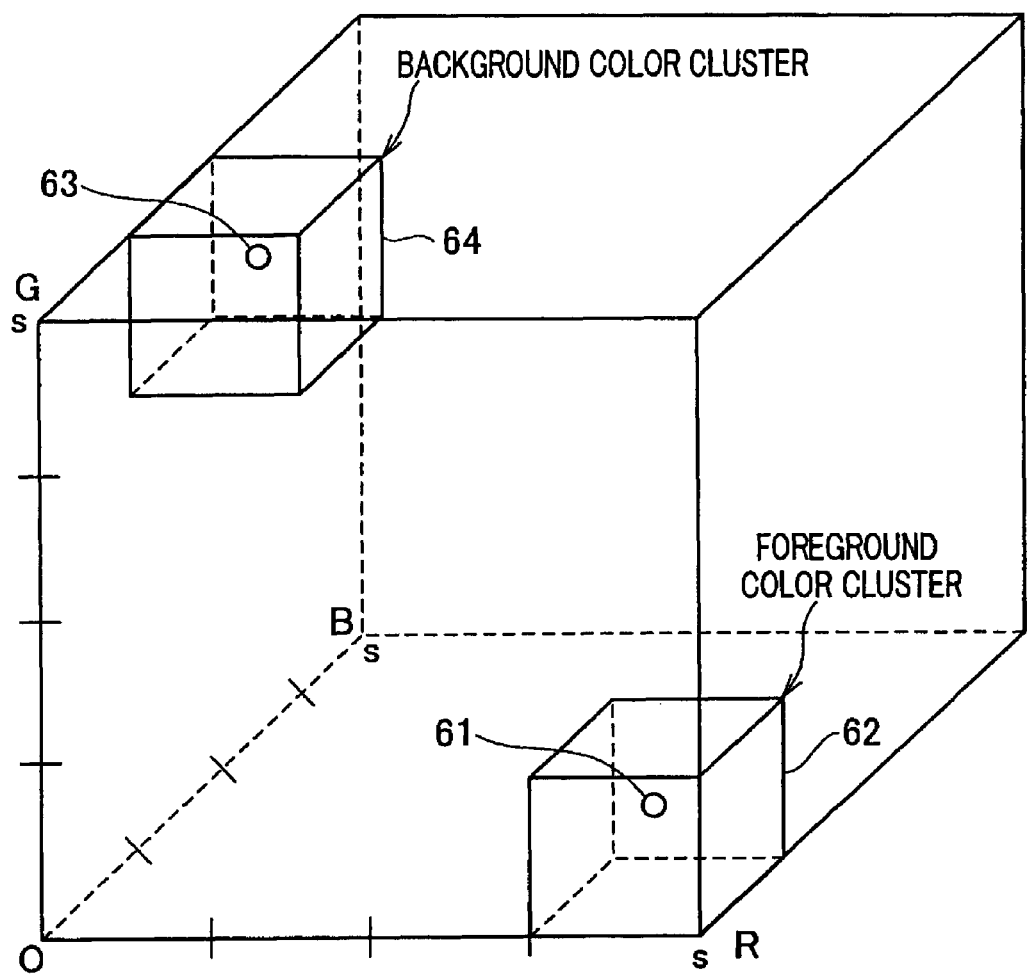
FIG. 4 is a diagram showing buckets created by an RGB color space being divided by grids whose division number is s.

FIG. 4 is a diagram showing buckets created by an RGB color space being divided by grids whose division number is s. In the example in FIG. 4, an RGB color space having three axes of R (red), G (green), and B (blue) with brightness of each color ranging from 0 to 255 is shown and each of R, G, and B is divided into four (s=4). Accordingly, the RGB color space is divided into 64 buckets. While the RGB color space is divided into 64 buckets in this example, the number of divided buckets may be more or less.

Here, a bucket b(p) to which a reference pixel $p(=(p_r, p_g, p_b))$ belongs can be calculated according to Formula (1) below:

$$b(p) = \left[ \frac{p_r}{256}s, \frac{p_g}{256}s, \frac{p_b}{256}s \right]$$ [Math 1]

As shown in FIG. 4, a reference bucket 62 to which the foreground pixel 61 belongs and a reference bucket 64 to which the background pixel 63 belongs are identified in this manner, the reference bucket 62 is registered as a foreground cluster (in other words, as a foreground color group), and the reference bucket 64 is registered as a background cluster (in other words, as a background color group) (such clustering is called a clustering method using buckets). According to the above cue line, a plurality of pixels on a respective cue line is designated as foreground pixels and background pixels, and foreground clusters and background clusters to which respective pixels belong are registered.

Figure 5:
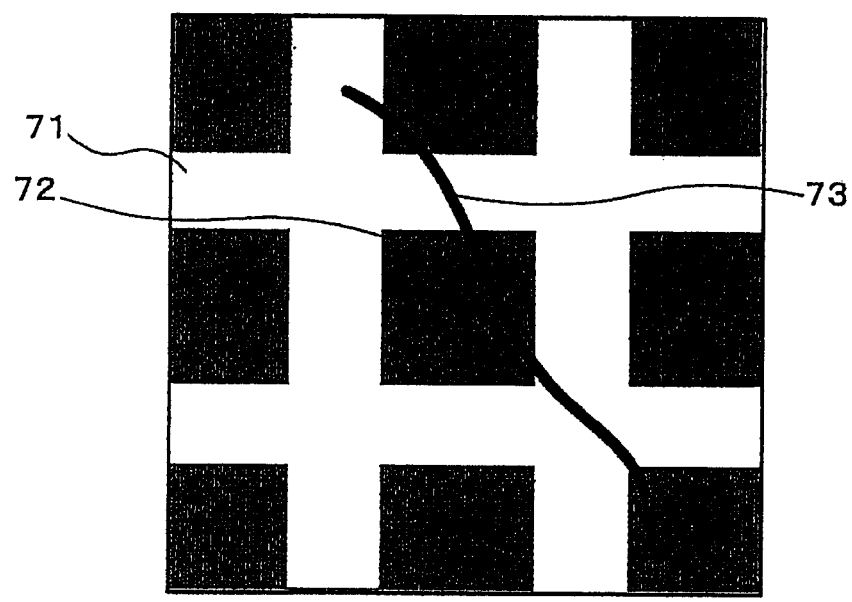
FIG. 5 is a diagram showing an example of texture pattern.

Incidentally, for example, a texture pattern (continuation of pattern) as shown in FIG. 5 may appear in the foreground region. In such a texture pattern, it is difficult to divide an image into the foreground and the background because the distance of at least two colors in the color space constituting the texture pattern becomes large even in the same foreground region. Thus, in the present embodiment, if a texture pattern appears in the foreground region, at least two foreground color clusters are made to be registered by a cue line 73 being drawn by the user in such a way that foreground pixels corresponding to each of at least two mutually different (the distance of color in the color space is farther apart than a fixed distance) colors (in the example in FIG. 5, the color in a region 71 and that in a region 72) constituting the texture pattern are designated. Accordingly, even if there is a texture pattern, it becomes possible to divide an image into the foreground and the background correctly.

Figure 6:
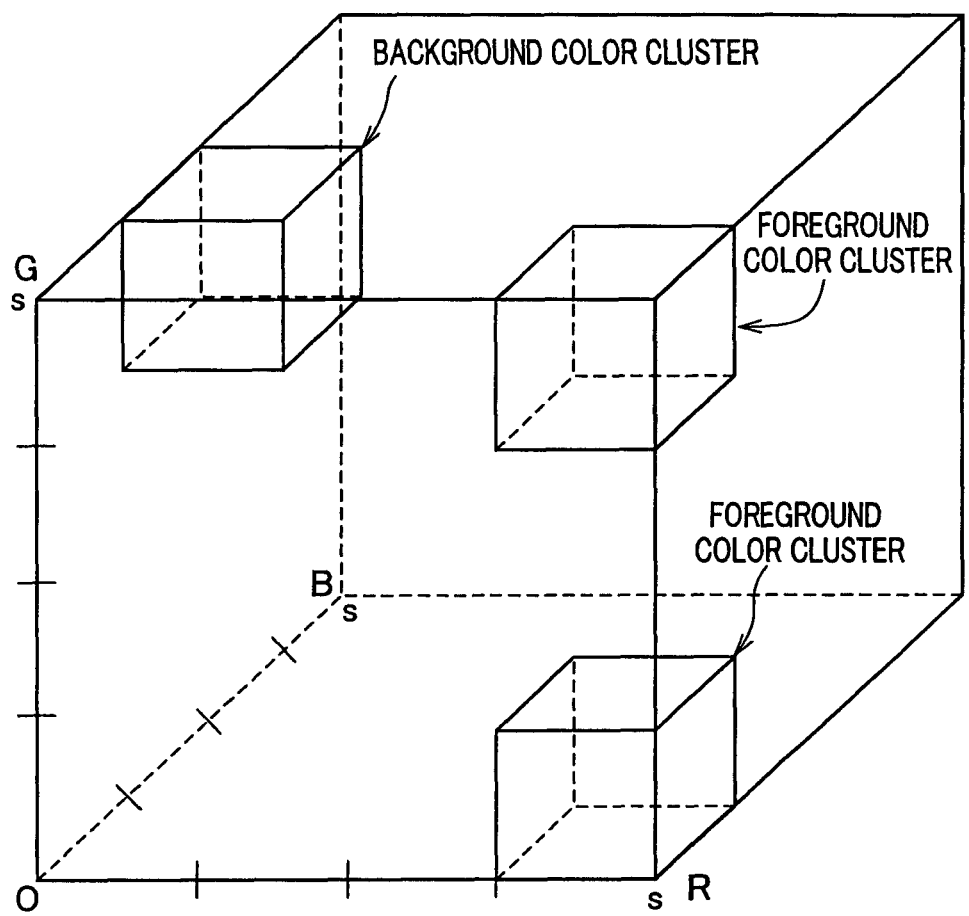
FIG. 6 is a diagram showing registered foreground color clusters and background color clusters when a texture patterns appears in the foreground region.

FIG. 6 is a diagram showing registered foreground color clusters and background color clusters when a texture pattern appears in the foreground region. In this case, as shown in FIG. 6, two foreground color clusters are registered and respective foreground pixels corresponding to each color constituting the texture pattern belong to each of the foreground color clusters. A texture pattern may appear in the background region and in that case, like the case of the foreground region, at least two background color clusters are registered.

Next, the system control unit 6 determines whether there is any pixel not yet determined whether to belong to the foreground or the background (step S4) and if there is such a pixel (step S4: YES), the system control unit 6 proceeds to step S5 and if there is no such pixel (step S4: NO), because the division into the foreground and the background has been completed, the system control unit 6 clips the foreground region as an object region desired by the user (step S10) before terminating the processing.

At step S5, on the other hand, the system control unit 6 identifies, among adjacent pixels adjacent (adjacent to one of up or down, left or right) to the reference pixels (foreground pixels or background pixels), one or two or more grow candidates not yet identified as grow candidates.

Figure 7:
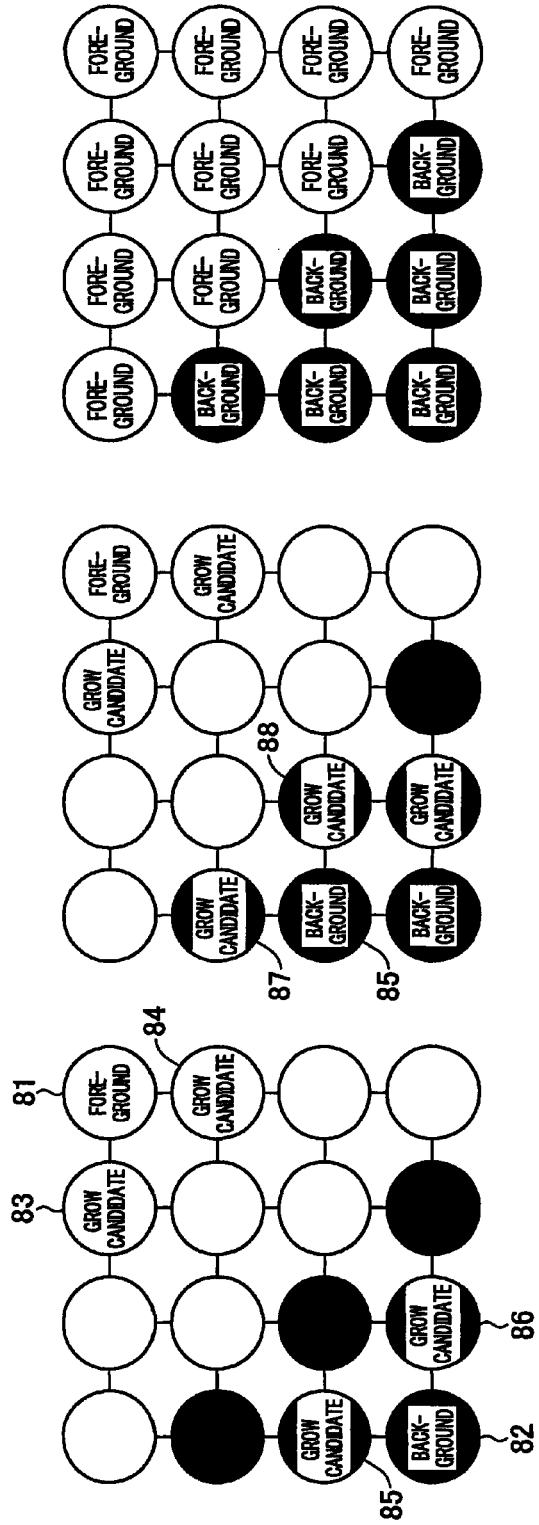
FIGS. 7A, 7B, and 7C are diagrams showing how pixels in an image are determined as a foreground or background.

FIGS. 7A, 7B, and 7C are diagrams showing how pixels in an image are determined as a foreground or background. In the example in FIG. 7A, pixels 83 and 84 adjacent to a foreground pixel 81 designated by the user and pixels 85 and 86 adjacent to a background pixel 82 designated by the user are identified in the initial stage as grow candidates.

Next, the system control unit 6 performs color distance calculation processing for each grow candidate (step S6). In the color distance calculation processing, the distance of color in the RGB color space between the reference pixel and a grow candidate adjacent thereto is calculated. The color distance $D(p_i, p_j)$ is can be calculated by Formula (2) below:

$$D(p_i, p_j) = \|p_i - p_j\|^2 \qquad \text{[Math 2]}$$
$$= (p_{i,r} - p_{j,r})^2 + (p_{i,g} - p_{j,g})^2 + (p_{i,b} - p_{j,b})^2$$

where $p_i (=(p_{i,r}, p_{i,g}, p_{i,b}))$ denotes a grow destination pixel (grow candidate) and $p_j (=(p_{j,r}, p_{j,g}, p_{j,b}))$ denotes a grow source pixel (reference pixel).

Next, the system control unit 6 performs belonging judgment processing to judge whether or not a grow candidate for which the color distance has been calculated belongs to the foreground color cluster or the background color cluster (step S7). In the belonging judgment processing, a bucket $b(p_i)$ to which the grow candidate $p_i$ belongs is calculated by Formula (1) shown above. Thus, according to the clustering method using buckets, when compared with, for example, the conventional k-means method (a method of performing clustering by giving a representative prototype (average value (mean)) to each of K clusters and assigning each individual to the closest prototype), whether the grow candidate belongs to the foreground color cluster or the background color cluster can be judged faster (with a smaller amount of calculation).

Information indicating a result of the judgment is stored by associating with the grow candidate.

Next, the system control unit 6 performs cost calculation processing that calculates grow costs for each grow candidate based on the color distance $D(p_i, p_j)$ calculated for the grow candidate and weights based on whether the grow candidate belongs to the foreground color cluster or the background color cluster determined for the grow candidate (step S8). The grow cost $cost_i$ can be calculated by Formula (3) below:

$$cost_i = C_1(p_i) \cdot D(p_i, p_j) + C_2(p_i) \cdot cost_j \qquad \text{[Math 3]}$$

where $C_1(p_i)$ and $C_2(p_i)$ denote weights based on belonging to the above clusters. More specifically, $C_1(p_i)$ is a weight of the color distance $D(p_i, p_j)$ and is intended to deal with a texture pattern. On the other hand, $C_2(p_i)$ is an accumulation condition for grow costs and is intended to deal with an enclave described later. $cost_j$ denotes a grow cost when a grow source pixel is a grow candidate. When a pixel is designated by the user, $cost_j=0$ because no grow cost is calculated in the first place.

$C_1(p_i)$ is represented by Formula (4) below:

$$C_1(p_i) =$$

$$1 \ (p_i \in K1, p_i \notin K2)$$

$$2 \ (p_i \in K1, p_i \in K2 \text{ or } p_i \notin K1, p_i \notin K2)$$

$$4 \ (p_i \notin K1, p_i \in K2) \qquad \text{[Math 4]}$$

where, when the grow source pixel $p_j$ is a foreground pixel, K1 is a foreground color cluster and K2 is a background color cluster and, when the grow source pixel $p_j$ is a background pixel, K1 is a background color cluster and K2 is a foreground color cluster.

According to Formula (4), when the grow source pixel $p_j$ is a foreground pixel, $C_1(p_i)=1$ if the grow candidate $p_i$ belongs to the foreground color cluster only, $C_1(p_i)=2$ if the grow candidate $p_i$ belongs to both the foreground color cluster and the background color cluster, or neither foreground color cluster nor background color cluster, and $C_1(p_i)=4$ if the grow candidate $p_i$ belongs to the background color cluster only. On the other hand, when the grow source pixel $p_j$ is a background pixel, $C_1(p_i)=1$ if the grow candidate $p_i$ belongs to the background color cluster only, $C_1(p_i)=2$ if the grow candidate $p_i$ belongs to both the foreground color cluster and the background color cluster, or neither foreground color cluster nor background color cluster, and $C_1(p_i)=4$ if the grow candidate $p_i$ belongs to the foreground color cluster only.

Figure 8:
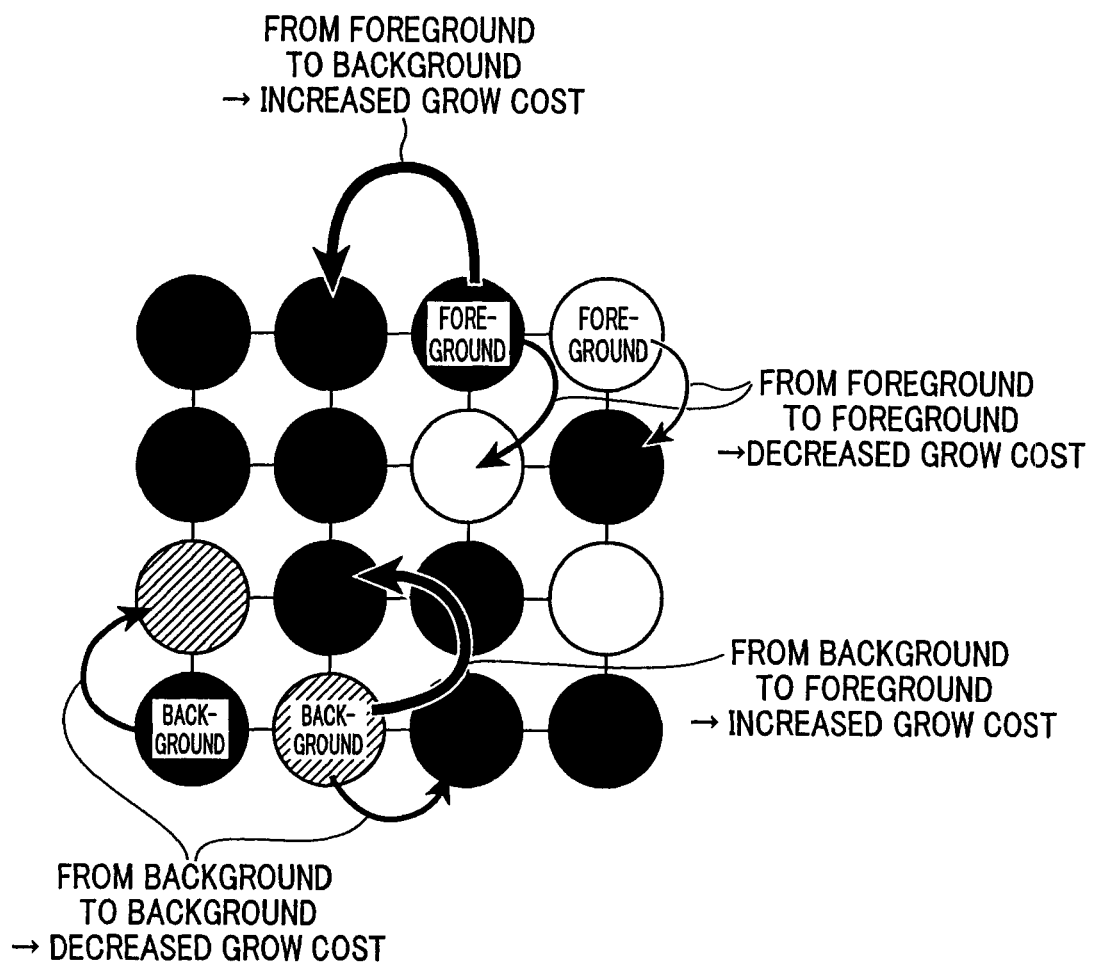
FIG. 8 is a diagram showing magnitudes of grow costs when there is a texture pattern in the image.

FIG. 8 is a diagram showing magnitudes of grow costs when there is a texture pattern in the image.

As shown in FIG. 8, when a pixel migrates (flies) from the foreground to the foreground (or from the background to the background), $C_1(p_i)$ becomes smaller, leading to a lower grow cost, whereas when a pixel migrates from the foreground to the background (or vice versa), $C_1(p_i)$ becomes larger, leading to a higher grow cost.

Accordingly, it becomes possible to divide an image into the foreground and the background by multiplying the color distance $D(p_i, p_j)$ by weight values even if there is a texture pattern.

$C_1(p_i)$ takes one of the values 1, 2, and 4 in Formula (4), but the size relation is important and, for example, $C_1(p_i)$ may take the values of 0.5, 1, and 2. However, the calculation of grow costs can be done as integer arithmetic when $C_1(p_i)$ takes the values of 1, 2, and 4 and in view of truncation errors, it is desirable to adopt power of 2.

On the other hand, $C_2(p_i)$ is represented by Formula (4) below:

$$C_2(p_i) =$$

$$0 \ (p_i \in K1)$$

$$1 \ (\text{otherwise}) \qquad \text{[Math 5]}$$

According to Formula (5), when the grow source pixel $p_j$ is a foreground pixel, $C_2(p_i)=0$ if the grow candidate $p_i$ belongs to the foreground color cluster only and $C_2(p_i)=1$ if the grow candidate $p_i$ does not belong to the foreground color cluster only. On the other hand, when the grow source pixel $p_j$ is a background pixel, $C_2(p_i)=0$ if the grow candidate $p_i$ belongs to the background color cluster only and $C_2(p_i)=1$ if the grow candidate $p_i$ does not belong to the background color cluster only.

That is, if it is clear that the grow candidate $p_i$ belongs to the foreground color cluster or the background color cluster, $C_2(p_i)=0$ and thus, no grow cost ($cost_j$) is accumulated. On the other hand, if it is not clear that the grow candidate $p_i$ belongs to the foreground color cluster or the background color cluster, $C_2(p_i)=1$ and thus, the grow cost ($cost_j$) is accumulated. By accumulating the grow cost ($cost_j$) in this manner, an enclave can correctly be dealt with.

Here, the enclave means a background region enclosed by a foreground region (or a foreground region enclosed by a background region) and corresponds to, for example, the center portion of a doughnut. According to the method by which an image is divided into the foreground and background using cue lines as tips, the system control unit 6 cannot recognize, for example, an enclave enclosed by a foreground region as a background unless a cue line is added to the enclave. Therefore, it is necessary to invert the foreground and the background when the grow cost exceeds a threshold T in order to cause the system control unit 6 to recognize the enclave. The threshold T can be calculated by Formula (6) below:

$$T=\max\{D(F_b, B_d), D(F_d, B_b)\} \quad [\text{Math 6}]$$

where $F_b$ denotes the foreground color of the maximum brightness, $F_d$ denotes the foreground color of the minimum brightness, $B_b$ denotes the background color of the maximum brightness, and $B_d$ denotes the background color of the minimum brightness. That is, the threshold T is the larger (max) of the distance $D(F_b, B_d)$ between the foreground color of the maximum brightness $F_b$ and the background color of the minimum brightness $B_d$ and the distance $D(F_d, B_b)$ between the foreground color of the minimum brightness $F_d$ and the background color of the maximum brightness $B_b$.

However, since there is in general anti-aliasing (blurring in an outline portion) in an outline portion of an enclave (for example, a boundary portion with a foreground region), the color distance between adjacent pixels in the outline portion is small and thus, it is difficult to correctly invert the foreground and the background based on the threshold T. Thus, in the present embodiment, as described above, the foreground and the background can correctly be inverted in an enclave based on the threshold T by accumulating the grow cost ($cost_j$) when $C_2(p_i)=1$ to increase the grow cost.

Figure 9A:
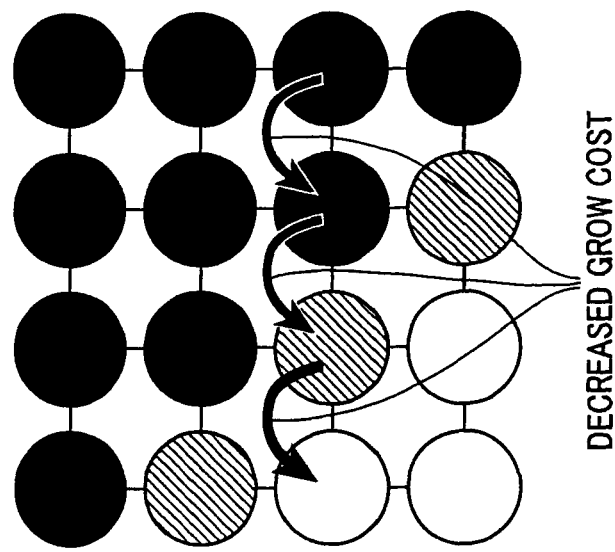
FIGS. 9A and 9B are diagrams showing a comparative example if the grow cost is not accumulated (FIG. 9A) and if the grow cost is accumulated (FIG. 9B) when there is anti-aliasing in the image.
Figure 9B:
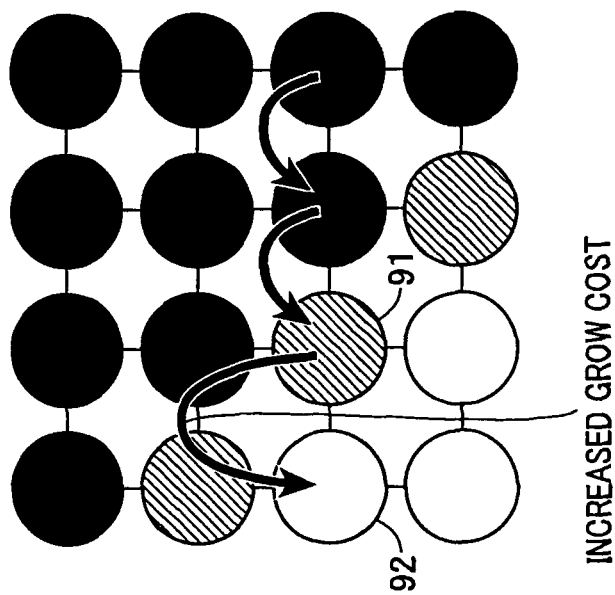

FIGS. 9A and 9B are diagrams showing a comparative example if the grow cost is not accumulated (FIG. 9A) and if the grow cost is accumulated (FIG. 9B) when there is anti-aliasing in the image.

In the example in FIG. 9A, the threshold T is not exceeded between pixels because the grow cost is not accumulated, but in the example in FIG. 9B, the grow cost is accumulated and thus, the grow cost when migrating from a pixel 91 to a pixel 92 may exceed the threshold T.

When the grow cost of each grow candidate is calculated as described above, the system control unit 6 performs foreground/background determination processing to determine the grow candidate having the smallest calculated grow cost as a foreground pixel or background pixel (step S9). For example, the grow candidate is determined to be the same foreground pixel or background pixel as the reference pixel (if the adjacent reference pixel is a foreground pixel, the grow candidate is determined as a foreground pixel) used to calculate the color distance (the above step S6). The grow candidate determined in this manner will hereinafter be handled as a new reference pixel.

In the example in FIG. 7B, with the pixel 85 having the minimum grow cost being determined as a background pixel, pixels 87 and 88 adjacent to the pixel 85 are identified as new grow candidates.

Then, after returning to step S4, the system control unit 6 determines whether there is any pixel not yet determined whether to belong to the foreground or the background and if there is such a pixel (step S4: YES), the system control unit 6 proceeds to step S5. Next, the system control unit 6 identifies, among adjacent pixels adjacent to new reference pixels, pixels not identified as grow candidates and performs, as described above, the color distance calculation processing (step S6), belonging judgment processing (step S7), cost calculation processing (step S8), and foreground/background determination processing (step S9) on the grow candidates. By repeating such processing until there is no grow candidate, pixels in the image are determined as a foreground pixel or background pixel one by one and when, as shown in FIG. 7C, all pixels in the image are determined as foreground pixels or background pixels, the foreground region is clipped from the image as an object region desired by the user at step S10.

As the state in FIG. 7C is approached, there may be a plurality of reference pixels adjacent to some grow candidate and in such a case, the color distance to each reference pixel and the grow cost are calculated and the grow candidate is determined to be the same foreground pixel or background pixel as the reference pixel having a smaller grow cost.

According to the embodiment, as described above, a foreground color cluster and a background color cluster are registered in advance by identifying each reference bucket to which foreground pixels and background pixels designated by the user belong, adjacent pixels adjacent to a foreground pixel or background pixel are identified as grow candidates, color distance calculation processing and belonging determination processing by the clustering method using buckets are performed on each grow candidate, the grow cost of each grow candidate is calculated based on the color distance $D(p_i, p_j)$ obtained from the above processing and weights based on whether the grow candidate belongs to the foreground color cluster or the background color cluster, the grow candidate having the lowest grow cost is determined as a foreground pixel or background pixel, and such processing is repeated until there is no grow candidate and therefore, an object region (foreground region) desired by the user can be clipped at high speed.

When a texture pattern appears in a foreground region or background region, the grow cost is calculated as described above after pixels of each of at least two mutually different colors constituting the texture pattern are designated to register each cluster (the foreground color cluster or background color cluster) and therefore, an image can correctly be divided into the foreground and the background even if there is the texture pattern in the image.

Further, by increasing the grow cost based on the above accumulation condition, the foreground and the background can correctly be caused to invert in an enclave even if there is anti-aliasing in an outline portion of the enclave.

As the form of utilizing the image edit apparatus S according to the present embodiment, in addition to utilizing a personal computer as a standalone computer, for example, the configuration and functions of the image edit apparatus S may be incorporated into a Web server or the like providing various information services on the Internet for use.

| DESCRIPTION OF SYMBOLS | |
|---|---|
| 1 | Operation unit |
| 2 | Display unit |
| 3 | Drive unit |
| 4 | Storage unit |
| 5 | Input/output interface unit |
| 6 | System control unit |
| 7 | System bus |
| S | Image edit apparatus |

The invention claimed is:

1. A foreground region extraction apparatus, comprising:
a display control means for causing an image to be displayed;
an acceptance means for accepting designation of at least one foreground pixel in a foreground region contained in the displayed image and at least one background pixel in a background region contained in the image, from a user;
a divided color space identification means for performing divided color space identification processing to identify, from among a plurality of divided color spaces created by a three-dimensional color space being divided, the divided color space to which, after the designated foreground pixel and the designated background pixel each being set as a reference pixel, each of the reference pixels belongs, as a reference divided color space;
a color distance calculation means for performing color distance calculation processing to calculate a color distance in the color space between each of the reference pixels and an adjacent pixel adjacent thereto;
a belonging judgment means for performing belonging judgment processing to judge whether each of the adjacent pixels belongs to each of the reference divided color spaces;
a cost calculation means for performing cost calculation processing to calculate a cost of each of the adjacent pixels, based on the color distance calculated for each of the adjacent pixels, and weights based on whether to belong to the reference divided color space judged for each of the adjacent pixels; and
a determination means for performing determination processing to determine the adjacent pixel having the lowest calculated cost as a foreground pixel or a background pixel,
wherein the determined adjacent pixel is set as a reference pixel to repeatedly perform the color distance calculation processing, the belonging judgment processing, the cost calculation processing, and the determination processing to extract the foreground region from the image.

2. The foreground region extraction apparatus according to claim 1, wherein
if the adjacent pixel adjacent to the reference pixel belongs to the reference divided color space, the weight is made smaller.

3. The foreground region extraction apparatus according to claim 1, wherein
the foreground pixels designated by the user are foreground pixels corresponding to each of at least two mutually different colors constituting a texture pattern appearing in the foreground region.

4. The foreground region extraction apparatus according to claim 1, wherein
if the adjacent pixel adjacent to the reference pixel does not belong to the reference divided color space, the cost is accumulated and, if the accumulated cost exceeds a threshold, a foreground and a background are inverted.

5. A foreground region extraction method executed by a computer, comprising:
a display control process of causing an image to be displayed;
an acceptance process of accepting designation of at least one foreground pixel in a foreground region contained in the displayed image and at least one background pixel in a background region contained in the image, from a user;
a divided color space identification process of performing divided color space identification processing to identify, from among a plurality of divided color spaces created by a three-dimensional color space being divided, the divided color space to which, after the designated foreground pixel and the designated background pixel each being set as a reference pixel, each of the reference pixels belongs, as a reference divided color space;
a color distance calculation process of performing color distance calculation processing to calculate a color distance in the color space between each of the reference pixels and an adjacent pixel adjacent thereto;
a belonging judgment process of performing belonging judgment processing to judge whether each of the adjacent pixels belongs to each of the reference divided color spaces;
a cost calculation process of performing cost calculation processing to calculate a cost of each of the adjacent pixels, based on the color distance calculated for each of the adjacent pixels, and weights based on whether to belong to the reference divided color space judged for each of the adjacent pixels; and
a determination process of performing determination processing to determine the adjacent pixel having the lowest calculated cost as a foreground pixel or a background pixel,
wherein the determined adjacent pixel is set as a reference pixel to repeatedly perform the color distance calculation processing, the belonging judgment processing, the cost calculation processing, and the determination processing to extract the foreground region from the image.

6. The foreground region extraction method according to claim 5, wherein
if the adjacent pixel adjacent to the reference pixel belongs to the reference divided color space, the weight is made smaller.

7. The foreground region extraction method according to claim 5, wherein
the foreground pixels designated by the user are foreground pixels corresponding to each of at least two mutually different colors constituting a texture pattern appearing in the foreground region.

8. The foreground region extraction method according to claim 5, wherein
if the adjacent pixel adjacent to the reference pixel does not belong to the reference divided color space, the cost is accumulated and, if the accumulated cost exceeds a threshold, a foreground and a background are inverted.

9. A recording medium in which a foreground region extraction program is computer-readably recorded,
the foreground region extraction program causing a computer to function as:
a display control means for causing an image to be displayed;

an acceptance means for accepting designation of at least one foreground pixel in a foreground region contained in the displayed image and at least one background pixel in a background region contained in the image, from a user;

a divided color space identification means for performing divided color space identification processing to identify, from among a plurality of divided color spaces created by a three-dimensional color space being divided, the divided color space to which, after the designated foreground pixel and the designated background pixel each being set as a reference pixel, each of the reference pixels belongs, as a reference divided color space;

a color distance calculation means for performing color distance calculation processing to calculate a color distance in the color space between each of the reference pixels and an adjacent pixel adjacent thereto;

a belonging judgment means for performing belonging judgment processing to judge whether each of the adjacent pixels belongs to each of the reference divided color spaces;

a cost calculation means for performing cost calculation processing to calculate a cost of each of the adjacent pixels, based on the color distance calculated for each of the adjacent pixels, and weights based on whether to belong to the reference divided color space judged for each of the adjacent pixels; and a determination means for performing determination processing to determine the adjacent pixel having the lowest calculated cost as a foreground pixel or a background pixel, wherein the determined adjacent pixel is set as a reference pixel to cause the computer to repeatedly perform the color distance calculation processing, the belonging judgment processing, the cost calculation processing, and the determination processing so that the computer functions to extract the foreground region from the image.

10. The recording medium according to claim 9, wherein if the adjacent pixel adjacent to the reference pixel belongs to the reference divided color space, the weight is made smaller.

11. The recording medium according to claim 9, wherein the foreground pixels designated by the user are foreground pixels corresponding to each of at least two mutually different colors constituting a texture pattern appearing in the foreground region.

12. The recording medium according to claim 9, wherein if the adjacent pixel adjacent to the reference pixel does not belong to the reference divided color space, the cost is accumulated and, if the accumulated cost exceeds a threshold, a foreground and a background are inverted.

* * * * *